June 25, 1957     B. S. POWELL     2,797,123
THREE WHEELED TOBACCO PRIMING VEHICLE
Filed Dec. 22, 1955     2 Sheets-Sheet 1
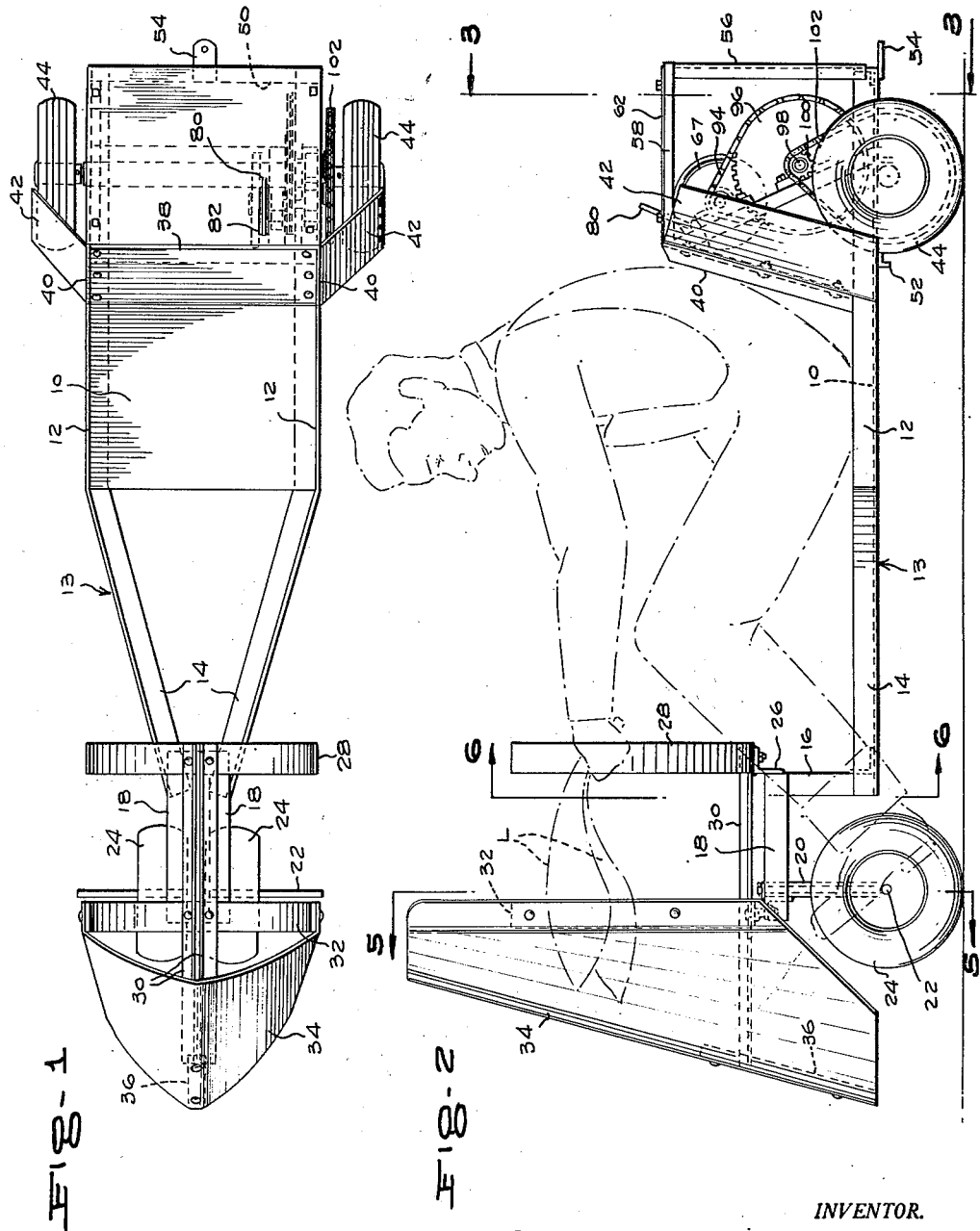
INVENTOR.
BENNINGTON S. POWELL
BY
McMorrow, Berman + Davidson
ATTORNEYS

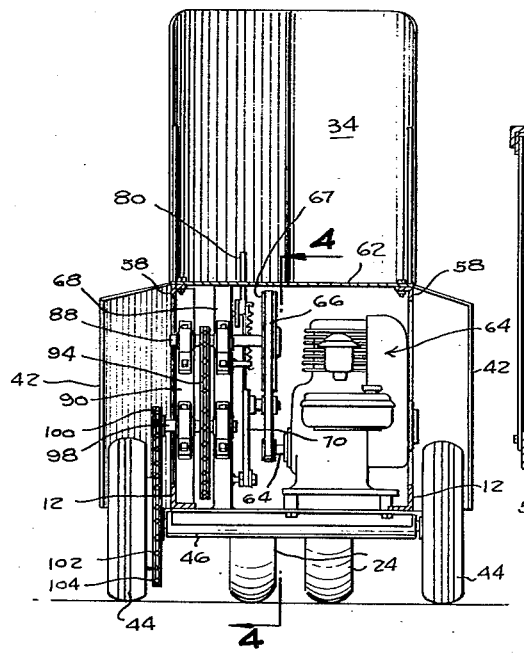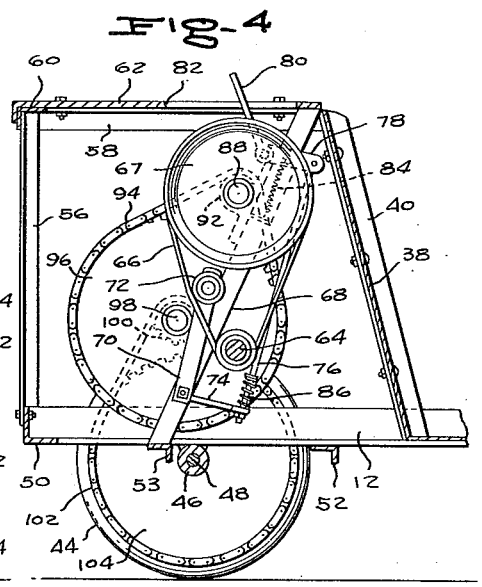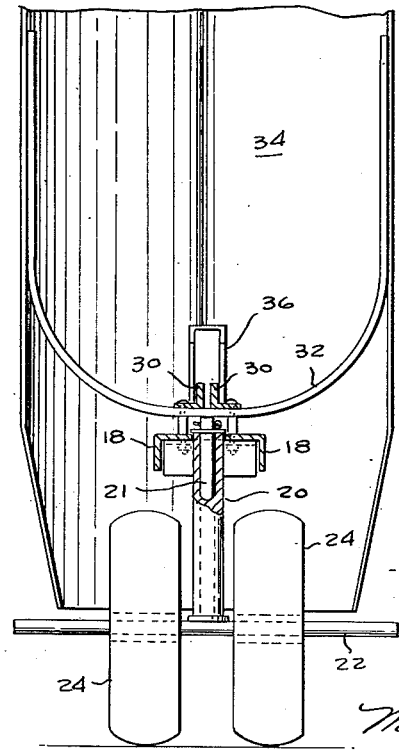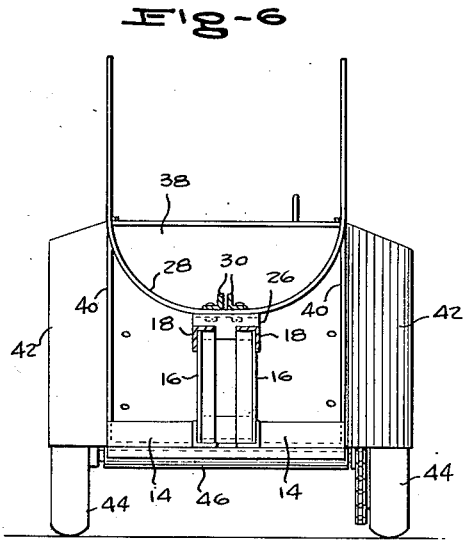
INVENTOR.
BENNINGTON S. POWELL

United States Patent Office 2,797,123
Patented June 25, 1957

2,797,123

THREE WHEELED TOBACCO PRIMING VEHICLE

Bennington S. Powell, Danville, Ky.

Application December 22, 1955, Serial No. 554,700

3 Claims. (Cl. 296—5)

This invention relates to a vehicle on which a worker may ride, during the priming of tobacco.

In tobacco farming, considerable difficulty resides in the process called priming, that is, the pulling of the leaves from the bottom of the plant. When tobacco is ripe, the stalk is approximately four to six feet tall. The leaves close to the ground are quite valuable, and due to the fact that tobacco is being controlled by a reduction in acreage each year, there has been a corresponding increase in the value of each plant.

Heretofore, few, if any, farmers pull the leaves from the bottom of the plant to take them to a curing barn. The pulling of such leaves is called priming. Undoubtedly, the failure of more farmers to follow this process results from the fact that the plants are grown so closely together that it is difficult to work in ripe tobacco without breaking some of the leaves. This would be particularly true when only the leaves at the bottom of the plant are, at the moment, being pulled.

The main object of the present invention is to provide a small vehicle adapted to travel along a row, in such a manner as to enable one to proceed down the row and prime the leaves, that is, pull the leaves from the bottom of the plant close to the ground, with the vehicle having means adapted to support the pulled leaves.

It is proposed, in this regard, to provide a vehicle so designed that it will not under any circumstances break the leaves of the plants, will not in any other way interfere with the regular planting, cultivation, or other activities performed in connection with the tobacco farming operation, will support a rider so that he is close to the ground and will be conveniently disposed for pulling the leaves to be primed, and will travel at a predetermined, very slow rate of speed just such as to permit one to prime the leaves of each plant in turn without hurrying, or on the other hand performing with excessive slowness, the priming operation.

Another object is to provide a vehicle of the type referred to which will be particularly designed to effect the efficient priming of the leaves of a substantially large area of plants in a minimum amount of time, with the use of the fewest possible number of workers, and with a minimum amount of effort on the part of each worker.

Still another object is to provide a vehicle of the type stated which will be relatively simply constructed, will be rugged, capable of manufacture at relatively low cost so that its initial cost and its regular cost of operation will be swiftly balanced and overcome by the savings and increased profits deriving from the use thereof, and will be designed for trouble free operation and for maximum maneuverability.

Other objects will appear from the following description, the claims appended thereto, and from the annexed drawing, in which like reference characters designate like parts throughout the several views, and wherein:

Figure 1 is a top plan view of a vehicle formed according to the present invention;

Figure 2 is a side elevational view thereof, the dotted lines showing a rider in supported position within the vehicle;

Figure 3 is a transverse sectional view on line 3—3 of Figure 2;

Figure 4 is a fragmentary longitudinal section through the motor and drive linkage assembly, on an enlarged scale, taken on line 4—4 of Figure 3;

Figure 5 is an enlarged transverse sectional view on line 5—5 of Figure 2, portions being broken away; and Figure 6 is a transverse sectional view on line 6—6 of Figure 2.

The reference numeral 10 designates a horizontally disposed, rectangular seat for an operator, and welded or otherwise fixedly secured to the opposite side edges of said seat are parallel, horizontal side rails 12 of a support frame generally designated at 13. The side rails 12 are integral at their front ends with forwardly converging extensions 14 coplanar with the side rails as shown in Figure 2.

Fixedly secured to and projecting upwardly from the convergent ends of frame extensions 14 is a relatively short, vertically disposed standard 16, and fixedly connected to and projecting forwardly from the standard 16 at opposite sides thereof are short angle members 18 between which is disposed the upper end of a stationary bearing sleeve 20, said sleeve having rotatable therein a steering post 21 the lower end of which is fixedly secured to the midlength portion of a horizontally disposed steering bar 22 disposed transversely of the frame. The steering bar provides an axle for a steerable wheel 24 disposed at opposite sides of the sleeve 20.

By reason of this arrangement, an operator seated upon the seat 10 will be supported in such a position that his feet may rest upon the projecting ends of the bar 22. As a result, the operator can steer the vehicle without use of the hands.

By reason of the construction so far described, it will be seen that there is provided an elongated, relatively narrow frame having an operator-supporting portion in a horizontal plane and formed at its front end with an upwardly offset extension, on which extension is rotatably supported a steerable wheel assembly adapted to be steered by the feet of the operator.

Fixedly secured to and extending between the rear ends of the short angle members 18 is a yoke supporting bar 26, and supported upon said bar 26 (see Figure 6) is the bight portion of a large, U-shaped yoke 28. Fixedly secured at their rear ends to said bight portion of yoke 28 are closely spaced, parallel, horizontally disposed angle members 30 forming a brace bar projecting forwardly beyond the upwardly offset front end of the frame in the manner shown in Figure 2, and secured to the intermediate portions of said angle members is the bight portion of a second yoke 32 spaced forwardly from and paralleling the yoke 28.

The yokes 28, 32, cooperate to define, as shown in Figure 1, a generally U-shaped cradle in which the operator may put the leaves L, after priming a plant adjacent which the vehicle is moving.

Protecting the leaves supported in the cradle is an elongated, vertically disposed shield 34, transversely curved with the shield being bowed forwardly as shown in Figure 1. The shield is inclined, that is, its lower end is leading in the sense of the direction of the movement of the vehicle (see Figure 2) and this particular formation of the shield has been found to insure against breakage of the leaves of the plants of a row along which the vehicle is moving. Fixedly securing the shield to the legs of yoke 32 are rivets or round head bolts, or any other suitable fastening elements, and at its lower end, the shield is braced by a longitudinally and centrally disposed brace bar 36 which is connected to members 30.

The back of the operator is supported by an inclined back plate 38, projecting upwardly from the rear edge of the seat plate 10, and the sides of the back plate 38 are extended laterally outwardly from the frame and are disposed in rearwardly diverging relation as shown in Figure 1, to provide fenders 42. Forwardly projecting flanges 40 are provided at opposite sides of the back plate 38, in the preferred, illustrated embodiment.

The fenders 42 are disposed in front of rear, drive wheels 44, for the purpose of fending from said wheels the leaves of adjacent plants.

The wheels 44 are disposed at opposite ends of a tubular axle housing 46 welded to the underside of the rear end portions of the side rails 12 of the frame (Figures 3 and 4) and journalled in the sleeve or axle housing 46 is an axle 48.

Fixedly secured to and connected between the rear extremities of the sides rails 12 is a rear cross bar 50 of the frame, and further reinforcing the frame transversely are cross bars 52, 53 spaced longitudinally of the frame from the rear cross bar 50 (see Figure 4). A tongue 54 projects rearwardly from the midlength portion of the rear cross bar 50, and is apertured so as to permit a trailing vehicle to be drawn behind the vehicle constituting the invention.

Projecting upwardly from and secured fixedly at their lower ends to the rear extremities of the side rails 12 are vertical posts 56, and connected between the upper ends of the posts 56 and the upper ends of the flanges 40 are horizontal members 58. Connected between the rear ends of the members 58 is an upper rear cross bar 60.

It will be seen that this provides a generally rectangular open frame for the motor and driving linkage of the device, and covering said frame is a top plate 62.

Considering now the drive of the vehicle, this includes a conventional internal combustion engine 64 mounted upon the cross bars 52, 53 and having a drive shaft 64 to which is connected a small drive pulley about which is trained a drive belt 66 rotating a large pulley 57.

Spaced laterally from the large pulley 67 is an inclined bearing support bar 68, and as shown in Figure 4, there is pivotally attached to the lower end portion of the bar 68 an arm 70 on the upper end of which is provided a roller 72.

The belt 66 is ordinarily loose upon the drive and driven pulleys, and accordingly, during rotation of the shaft 64 with the belt 66 in a slack condition the driven pulley 67 will not turn. However, on swinging of the arm 70 in a counterclockwise direction (viewing the same as in Figure 4), the roller 72 will bear against the belt 66, placing said belt under tension and thus causing drive to be transmitted to the pulley 67.

For the purpose of controlling the swinging movement of the arm 70, there is fixedly secured to the lower end portion of said arm a rod 74, disposed substantially at right angles to the arm 70 as shown in Figure 4. Rod 74 projects forwardly, and at its forward end has an opening loosely receiving the lower end portion of a connecting rod 76 pivotally connected at its upper end to an arm 78 fulcrumed intermediate its ends upon the upper end portion of the bar 68. Secured to the other end of the arm or link 78 is a handle 80 projecting upwardly through a slot 82 formed in the top plate 62.

A contractile spring 84 is connected between the fulcrum link 78 and an ear that projects outwardly from the bar 68 below said link 78. The connection of the spring 84 to the link 78 is such that the spring will move over a dead center, that is, across the centrally disposed pivot point of link 78 on swinging of the link in opposite directions.

Thus, if the handle 80 is swung to the right in Figure 4 from the position thereof shown in this figure, the spring 84 will move over a dead center and with the link 78 rocking clockwise, will snap the link in a clockwise direction, to maintain the link in the position to which it has been turned in said direction.

This lowers the rod 76, and as a result a compression coil spring 86 circumposed about the lower end portion of the rod 76 will press against the arm 74, causing the arm 70 to swing clockwise in Figure 4 out of engagement with the belt 66.

If the handle 80 is swung in an opposite direction, the link 78 will again be retained in the position to which it is swung by movement of spring 84 over a dead center, and this will now have the effect of swinging the arm 70 in an opposite direction, to place the belt under tension thus causing drive to be transmitted from the drive shaft to the motor to the pulley 67.

The pulley 67 is keyed or otherwise made rotatable with a jack shaft 88 (see Figure 3) journalled in bearings provided upon the bar 68 and on a second bearing support bar 90 that parallels bar 68. Between the bearings there is connected to the shaft 88 a small sprocket 92 (see Figure 4) about which is trained a sprocket chain 94 engaging a large diameter sprocket 96 secured to a shaft 98. A small sprocket 100 is connected to the shaft 98 for rotation therewith, and meshing with the teeth of sprocket 100 is a chain 102 meshing also with the teeth of a large sprocket 104 secured to the axle 48 for the purpose of transmitting drive wheels.

It will be seen that this provides a speed-reducing transmission or drive from the shaft of the motor to the wheel axle, and in a working device, it has been found that the speed reduction should be at the ratio of about 120 revolutions of the drive shaft of the motor to one revolution of the wheel axle. This causes a slow, steady movement of the vehicle down the row of plants, with said movement being slowed sufficiently to permit the operator to prime the leaves of each plant as the vehicle moves down the row. At the same time, the speed is sufficiently fast to assure that no more time will be spent adjacent a single plant than is necessary to prime the leaves thereof.

The movement of the vehicle is thus continous from end to end of the row, and each time, the operator has ample time to dispose the primed leaves in the cradle 28, 32. At the end of the row, the leaves are removed from the cradle and deposited in a suitable container or otherwise handled for transmission to the curing barn, and the vehicle is turned around and proceeds in a reverse direction, down the next adjacent row.

The construction, as will be apparent, causes the vehicle to be particularly adapted for priming operations on tobacco plants, and to my knowledge there has not been previously devised any vehicles which will permit said operations to be carried out efficiently. The conventional practice previously has been for the operator to walk along the row, stooping over to prime the leaves close to the ground, and this of course has been a laborious, time-consuming operation, which has proven so costly as to cause the greatest number of farmers to avoid priming, despite the recognized value of this phase of tobacco farming.

The particular adaptability of the vehicle for carrying out operations of the type referred to derives in the first instance from the fact that the operator is supported at so low an elevation above the ground as to be disposed conveniently for priming the leaves close to the ground. Further, the vehicle moves at a very slow rate, assuring the efficient priming of each plant and the disposition of the leaves pulled from the plant in the cradle, as the vehicle reaches the next plant. Still further, the steering of the vehicle is done entirely with the feet, leaving the hands of the worker free for priming the plants and depositing the leaves in the cradle. Then again, the provision of the shield at the front of the vehicle insures against the breakage of leaves of plants as the vehicle passes the same, further assurance against said breakage being provided by the fenders 42 disposed in front of the drive wheels 44.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A tobacco plant primer comprising a wheeled frame close to the ground; a forwardly bowed shield at the front end of the frame having a lower end extending close to the ground for fending off the vehicle the leaves of plants adjacent which the vehicle is moving; a cradle disposed behind said shield and adapted for holding leaves pulled from said plants by the operator, comprising a pair of identical U-shaped yokes aligned longitudinally of the frame, the legs of one of said yokes being secured to opposite sides of said shield intermediate the upper ends of the shield with the bight portions of the yokes being secured to the frame; and a brace bar extending in a fore-and-aft direction on the vehicle and secured at one end to the bight of the other yoke, said bar being secured intermediate its ends to said one yoke and at its other end to the midwidth portion of the shield.

2. A tobacco plant primer comprising a wheeled frame close to the ground; a forwardly bowed shield at the front end of the frame having a lower end extending close to the ground for fending off the vehicle the leaves of plants adjacent which the vehicle is moving; a cradle disposed behind said shield and adapted for holding leaves pulled from said plants by the operator, comprising a pair of identical U-shaped yokes aligned longitudinally of the frame, the legs of one of said yokes being secured to opposite sides of said shield intermediate the upper ends of the shield with the bight portions of the yokes being secured to the frame; and a brace bar extending in a fore-and-aft direction on the vehicle and secured at one end to the bight of the other yoke, said bar being secured intermediate its ends to said one yoke and at its other end to the midwidth portion of the shield, the connection of the bar to the shield being disposed intermediate the ends of the shield to form with the legs of said one yoke a series of bracing elements spaced transversely of the shield intermediate the ends thereof.

3. A tobacco plant primer comprising a wheeled frame close to the ground; a forwardly bowed shield at the front end of the frame having a lower end extending close to the ground for fending off the vehicle the leaves of plants adjacent which the vehicle is moving; a cradle disposed behind said shield and adapted for holding leaves pulled from said plants by the operator, comprising a pair of identical U-shaped yokes aligned longitudinally of the frame, the legs of one of said yokes being secured to opposite sides of said shield intermediate the upper ends of the shield with the bight portions of the yokes being secured to the frame; and a brace bar extending in a fore-and-aft direction on the vehicle and secured at one end to the bight of the other yoke, said bar being secured intermediate its ends to said one yoke and at its other end to the midwidth portion of the shield, the connection of the bar to the shield being disposed intermediate the ends of the shield to form with the legs of said one yoke a series of bracing elements spaced transversely of the shield intermediate the ends thereof, the side portions of the shield defining, with the yokes, sides for said cradle with the forwardly bowed midwidth portion of the shield defining a front wall on the cradle disposed for protectively extending in front of objects deposited within the cradle.

References Cited in the file of this patent

UNITED STATES PATENTS

| 613,028 | Duvall | Oct. 25, 1898 |
| 1,134,184 | Cook | Apr. 6, 1915 |
| 1,172,326 | Walker | Feb. 22, 1916 |
| 1,811,054 | Kipp et al. | June 23, 1931 |
| 2,520,835 | England | Aug. 29, 1950 |
| 2,583,358 | Cesan | Jan. 22, 1952 |